United States Patent
Bries et al.

(10) Patent No.: US 7,781,056 B2
(45) Date of Patent: Aug. 24, 2010

(54) REMOVABLE FOAM ADHESIVE TAPE

(75) Inventors: James L. Bries, Cottage Grove, MN (US); Michael D. Hamerski, Baldwin, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 797 days.

(21) Appl. No.: 09/809,805

(22) Filed: Mar. 16, 2001

(65) Prior Publication Data

US 2001/0019764 A1 Sep. 6, 2001

Related U.S. Application Data

(63) Continuation of application No. 09/267,543, filed on Mar. 12, 1999, now Pat. No. 6,231,962, which is a continuation of application No. 08/308,937, filed on Sep. 20, 1994, now Pat. No. 6,402,206, which is a continuation-in-part of application No. 08/114,500, filed on Aug. 31, 1993, now abandoned.

(51) Int. Cl.
*B32B 27/32* (2006.01)
*B32B 3/26* (2006.01)
*B32B 7/12* (2006.01)

(52) U.S. Cl. ............ 428/343; 428/220; 428/304.4; 428/317.1; 428/317.3; 428/354

(58) Field of Classification Search ......... 428/220, 428/317.3, 354, 343, 317.1, 304.4; 248/304
See application file for complete search history.

(56) References Cited

U.S. PATENT DOCUMENTS

| | | | | |
|---|---|---|---|---|
| 4,241,774 A | * | 12/1980 | Pell | ............ 206/315.6 |
| 4,268,567 A | | 5/1981 | Harmony | |
| 4,358,489 A | | 11/1982 | Green | |
| 4,810,570 A | * | 3/1989 | Rutten et al. | ............ 428/318.6 |
| 4,839,206 A | | 6/1989 | Waldenberger | |
| 4,942,071 A | | 7/1990 | Frye | |
| 5,334,447 A | | 8/1994 | Kitamura et al. | |
| 5,516,581 A | * | 5/1996 | Kreckel et al. | ............ 428/317.3 |
| 5,897,949 A | | 4/1999 | Lühmann et al. | |
| 6,004,665 A | | 12/1999 | Lühmann et al. | |
| 6,231,962 B1 | * | 5/2001 | Bries et al. | ............ 428/317.3 |

(Continued)

FOREIGN PATENT DOCUMENTS

CA 2 096 935 7/1992

(Continued)

OTHER PUBLICATIONS

Ethafoam Product Information, Dow Chemical.*

(Continued)

*Primary Examiner*—Victor S Chang
(74) *Attorney, Agent, or Firm*—David B. Patchett

(57) ABSTRACT

Conformable pressure-sensitive adhesive tapes which comprise a layer of polymeric foam in the backing and may be adhered firmly to a substrate and thereafter removed therefrom after only being stretched at an angle no greater than about 35° from the surface of the substrate. Articles for mounting an object such as a picture to a surface such as a wall comprising a pressure-sensitive adhesive tape of the invention are also described.

7 Claims, 2 Drawing Sheets

U.S. PATENT DOCUMENTS 6,403,206 B1 * 6/2002 Bries et al. .................. 428/220

FOREIGN PATENT DOCUMENTS

| CA | 2 096 936 | 7/1992 |
| DE | 3 332 513 | 4/1985 |
| DE | 196 49 728 A1 | 6/1998 |
| JP | 3-120534 | 12/1991 |
| JP | 6-172720 | 6/1994 |
| WO | WO 89/08591 | 9/1989 |
| WO | WO 92/11332 | 7/1992 |
| WO | WO 92/11333 | 7/1992 |

OTHER PUBLICATIONS

Mills et al., Finite Element Analysis (FEA) Applied to Polyethylene Foam Cushions in Package Drop Tests, Packaging Technology and Science, vol. 18, No. 1, Jan. 2005, pp. 29-38.*

Meinecke, et al. "Mechanical Properties of Polymeric Foams", Technomic Publishing Co., pp. 20, 21 and 61, 1973.*

* cited by examiner

REMOVABLE FOAM ADHESIVE TAPE

CROSS REFERENCE TO RELATED APPLICATION

This application is a continuation application of U.S. application Ser. No. 09/267,543, filed Mar. 12, 1999, now U.S. Pat. No. 6,231,962 B1, which is a continuation application of U.S. application Ser. No. 08/308,937, filed Sep. 20, 1994, now U.S. Pat. No. 6,402,206 B1, which is a continuation-in-part of U.S. application Ser. No. 08/114,500, filed Aug. 31, 1993, now abandoned, which are hereby incorporated by reference in their entirety.

FIELD OF THE INVENTION

The present invention relates to adhesive tapes which can be firmly adhered to a surface and thereafter removed therefrom without substantially damaging the surface or leaving substantial adhesive residue thereon.

BACKGROUND OF THE INVENTION

EPA 92.903259.7 describes a pressure-sensitive adhesive tape comprising a highly extensible, substantially non-recoverable backing, bearing on at least one major surface thereof a layer of pressure-sensitive adhesive, the tape being capable of being firmly bonded to a substrate and being further capable of being removed therefrom after only being stretched at an angle no greater than about 35° from the surface of the substrate. The backing has a Young's modulus of at least 2,500 psi.

BRIEF SUMMARY OF THE INVENTION

The present invention provides a pressure-sensitive adhesive tape comprising a backing and a first layer of a pressure-sensitive adhesive composition coated on at least one surface of the backing, the backing comprising a layer of polymeric foam which is 30 to about 1000 mils (0.76 mm to about 25 mm) in thickness (and preferably has a density of about 10 to about 15 pounds per cubic foot), said backing further having a lengthwise elongation at break of from about 50% to about 1200%, the tape being capable of being firmly bonded to a substrate and thereafter being removable therefrom after being stretched at an angle no greater than about 35° (preferably no greater than about 10°) from the surface of the substrate without the backing rupturing prior to the removal of the tape from the substrate and without leaving substantial pressure-sensitive adhesive residue on the substrate.

The present invention further provides a pressure-sensitive adhesive tape comprising a multilayer backing and a first layer of a pressure-sensitive adhesive composition coated on at least one surface of the backing, the backing comprising a first layer of polymeric foam and either a layer of a solid polymeric film or a second layer of polymeric foam adhered in adjoining relationship to one another, the backing further having a lengthwise elongation at break of from about 50% to about 1200%, said tape being capable of being firmly bonded to a substrate and thereafter being removable therefrom after being stretched at an angle no greater than about 35° (preferably no greater than about 10°) from the surface of the substrate without the backing rupturing prior to the removal of the tape from the surface.

The present invention still further provides a pressure-sensitive adhesive tape comprising a multi-layer backing and a first layer of a pressure-sensitive adhesive composition coated on at least one surface of the backing, the backing comprising a layer of a heat laminated or coextruded polymeric foam/polymeric film and either an additional layer of solid polymeric film or an additional layer of polymeric foam adhered to the polymeric film of the heat laminated or coextruded polymeric foam/polymeric film, the backing further having a lengthwise elongation at break of from about 50% to about 1200%, the tape being capable of being firmly bonded to a substrate and thereafter being removable therefrom after being stretched at an angle no greater than about 35° (preferably no greater than about 10°) from the surface of the substrate without the backing rupturing prior to the removal of the tape from the surface.

The backings of the tapes of the invention which comprise a polymeric foam layer and one or more additional polymeric foam layers and/or solid polymeric film layers adhered together as the backing preferably have an overall Young's modulus of less than about 2,400 psi, more preferably less than about 2,000 psi, and most preferably between about 1,000 and 1,400 psi.

The polymeric foam layer(s) employed in tapes comprising a backing comprising a foam layer and one or more additional foam layers and/or film layers preferably have a density of about 2 to about 8 pounds per cubic foot (pcf), and more preferably about 4 to about 6 pcf. Further each such foam layer is preferably about 5 to about 1000 mils and is more preferably about 15 to about 125 mils in thickness.

The backing of the tapes of the invention no matter their construction are preferably at least about 30 mils in thickness, more preferably about 40 to 150 mils in thickness, and most preferably about 40 to about 80 mils.

The backing of the tapes of the present invention preferably are substantially plastic in nature so as not to return to their original shape or size after being stretched. This permits removal of the tape from a surface to which it has been adhered without concern that it will snap back with such a force to cause injury.

The present invention also provides pressure-sensitive adhesive tapes according to the foregoing constructions, but including a second layer of a pressure-sensitive adhesive composition situated on the backing opposite the first layer of pressure-sensitive adhesive composition. The second layer of pressure-sensitive adhesive may be compositionally the same or different than the first layer of pressure-sensitive composition.

The double-coated pressure-sensitive adhesive tapes of the invention are particularly useful in mounting and joining applications.

Presence of one or more polymeric foam layers in the backing of the tapes of the invention provide tapes which conform desirably to rough or irregular surfaces in both mounting and joining applications thereby maximizing adherence of the tape to such surfaces. Presence of one or more foam layers in the backing also provides tapes which may be useful in cushioning or sound deadening applications.

A mounting device such as a plastic hook for mounting an article such as a picture to a surface such as a wall is also described which comprises a tape of the invention. Examples of other mounting devices are devices for mounting dispensers or the like to a surface such as a wall.

DETAILED DESCRIPTION OF THE INVENTION

Elongation at break and Young's modulus (elastic modulus) in respect of a tape of the invention or a backing or a polymeric layer in the backing of a tape of the invention is measured for purposes of the instant specification and claims following ASTM D882, incorporated herein by reference, using an Instron™ Model 1122 Tensile Tester (available from Instron Corporation, Canton, Mass. 02021) or other suitable device. For elongation at break measurements, tape samples are cut to ½"×4" (1.27 cm×10.2 cm) and the Instron™ is set for a 2-inch (5.08 cm) gauge length, 20 inch/minute (50.8 cm/minute) cross-head speed and 20 lb. (9.1 kg) full scale load. For Young's modulus measurements, a backing or a polymeric layer for use in a backing is cut to ½"×10" (1.27 cm×25.4 cm) and the Instron™ is set for an 8-inch (20.3 cm) gauge length, 1-inch/minute (2.54 cm/minute) cross-head speed and 20 lb. (9.1 kg) full scale load.

Figure 1:
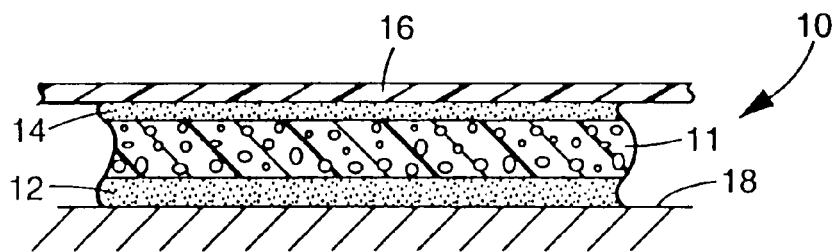
FIG. 1 is an enlarged side view in cross-section of one embodiment of a tape of the present invention shown adhering one substrate to another.

There is shown in FIG. 1 tape 10 of the invention comprising polymeric foam backing 11 having layers 12 and 14 of the same or different pressure-sensitive adhesive compositions on opposite surfaces thereof. Layer 14 of adhesive adheres tape 10 to hook 16 (shown in partial) while layer 12 adheres tape 10 to wall 18 (shown in partial). The tape construction of this embodiment is particularly suited for stretching the entire tape to effect debonding from both hook 16 and wall 18.

Figure 2:
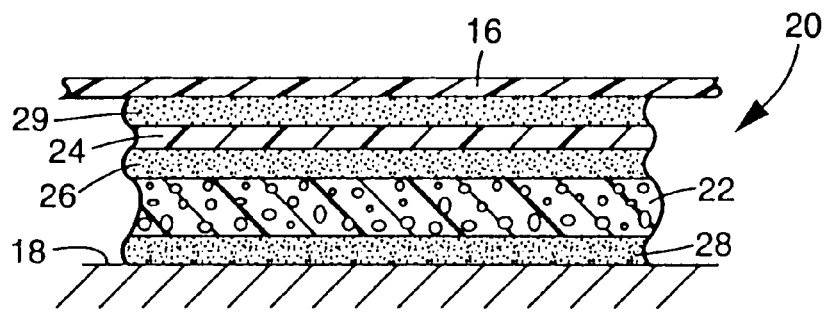
FIG. 2 is an enlarged side view in cross-section of a second embodiment of a tape of the present invention shown adhering one substrate to another.

FIG. 2 illustrates as another embodiment of the invention tape 20 comprising polymeric foam layer 22 and polymeric film layer 24 which are adhered to one another by layer 26 of a pressure-sensitive adhesive composition. Polymeric film layer 24 may be used to increase the load bearing strength and rupture strength of the tape, particularly where polymeric foam layer 22 lacks properties otherwise required in a backing to permit removal by stretching. Inclusion of a film layer 24 therefore permits greater latitude in the selection of a foam layer 22 to optimize, for example, conformability and resiliency properties. Foam layer 22, film layer 24 and adhesive layer 26 constitute the backing of tape 20. Foam layer 22 and film layer 24 also have layers 28 and 29 of the same or different pressure-sensitive adhesive compositions coated thereon for adhering tape 20 to hook 16 and wall 18. The tape construction of this embodiment again is particularly suited for stretching the entire tape to effect debonding from both hook 16 and wall 18. Alternatives to employment of polymeric film layer 24 to provide the same increase in load bearing strength and rupture strength would be conventional reinforcement scrims such as non-woven scrims, plastic meshes or the like.

Figure 3:
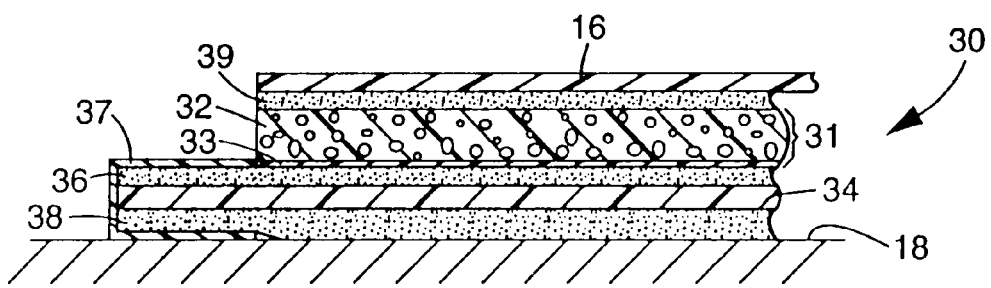
FIG. 3 is an enlarged side view in cross-section of a third embodiment of a tape of the present invention shown with a pulltab and adhering one substrate to another.

Illustrated in FIG. 3 as a third embodiment of the invention is tape 30 comprising a coextruded foam/film layer 31 comprising a polymeric foam layer 32 and a polymeric film layer 33. Polymeric film layer 34 is adhered to foam/film layer 31 by layer 36 of a pressure-sensitive adhesive composition. Foam/film layer 31, film layer 34 and adhesive layer 36 constitute the backing of tape 30. Foam layer 32 and film layer 34 bear on their surfaces layers 38 and 39 of the same or different pressure-sensitive adhesive compositions for adhering tape 30 to hook 16 and wall 18. This third embodiment is particularly designed for stretching of film layer 34 to effect debonding of adhesive layer 38 from wall 18 and adhesive layer 36 from foam/film layer 31. In this embodiment, stretching of film layer 34 is facilitated through extension of film layer 34, adhesive layer 38 and adhesive layer 36 beyond the end of foam/film layer 31 as illustrated. The extended portion is configured to include a tab 37 which is adhered to film layer 34 by means of adhesive layers 38 and 36 and facilitates stretching of film layer 34 to effect debonding. Debonding of adhesive layer 36 from foam/film layer 31 is facilitated by the presence of the relatively smooth surface provided by film layer 33.

Figure 4:
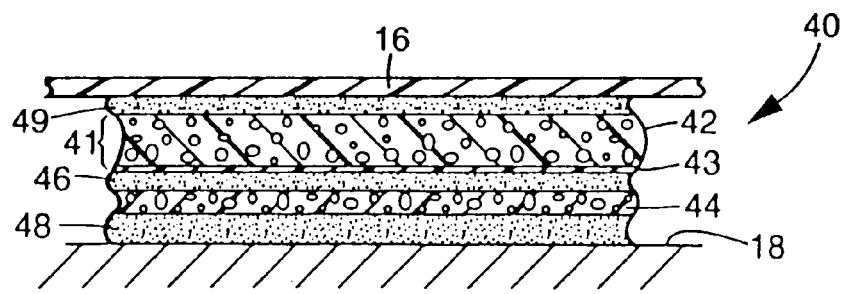
FIG. 4 is an enlarged side view in cross-section of a fourth embodiment of a tape of the present invention shown adhering one substrate to another.

Still further, there is illustrated in FIG. 4 tape 40 of the invention which comprises a coextruded foam/film layer 41 comprising a polymeric foam layer 42 and a polymeric film layer 43. A polymeric foam layer 44 is adhered to foam/film layer 41 by layer 46 of a pressure-sensitive adhesive. Foam/film layer 41, foam layer 44 and adhesive layer 46 constitute the backing of tape 40. Layers 48 and 49 of the same or different pressure-sensitive adhesive compositions are present on foam layers 42 and 44 for adhering tape 40 to hook 16 and wall 18. Stretching of foam layer 44 effects debonding of adhesive layer 48 from wall 18 and adhesive layer 46 from foam/film layer 41. Again presence of film layer 43 facilitates debonding at its interface with adhesive layer 46. Though not illustrated, it is envisioned that this embodiment could be equipped with a tab as shown in FIG. 3 to facilitate stretching of foam layer 44.

Figure 5:
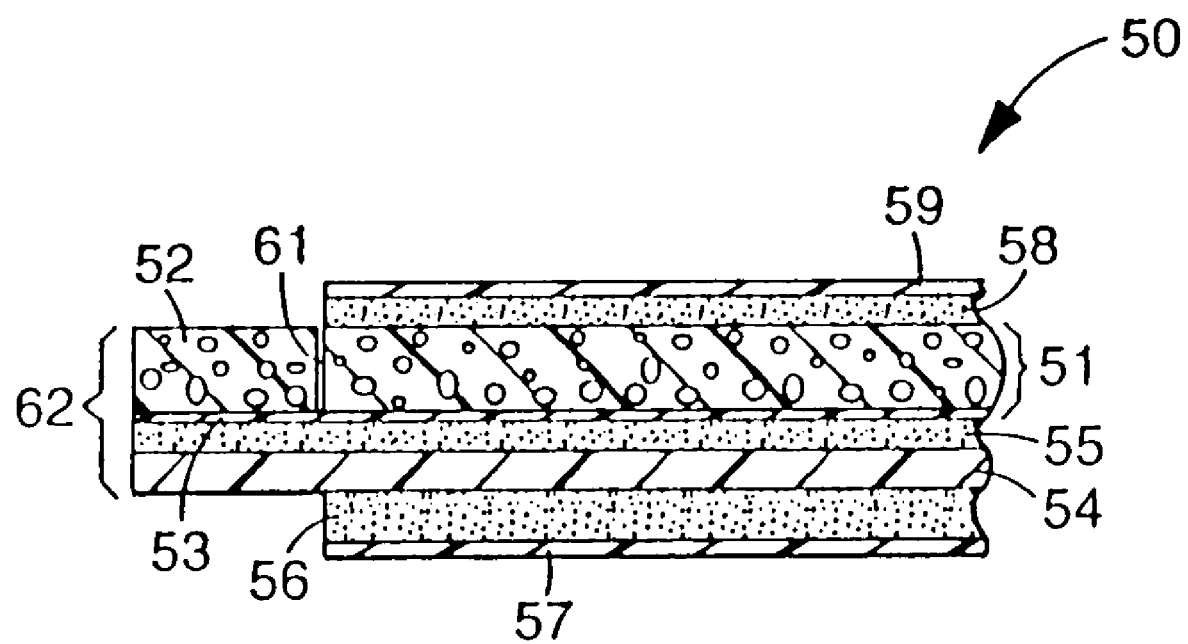
FIG. 5 is an enlarged side view in cross-section of a fifth embodiment of a tape of the present invention shown with a pulltab and two release liners.

Still further, there is illustrated in FIG. 5 tape 50 of the invention which comprises a heat laminated foam/film layer 51 comprising a polymeric foam layer 52 and a polymeric film layer 53. A polymeric film layer 54 is adhered to foam/film layer 51 by layer 55 of a pressure-sensitive adhesive. Foam/film layer 51, film layer 54 and adhesive layer 55 constitute the backing of tape 50. Layers 56 and 58 of the same or different pressure-sensitive adhesive compositions are present on film layer 54 and foam layer 52 for adhering tape 50 to a hook and the wall, respectively. Release liners 57 and 59 protect adhesive layers 56 and 58 prior to use of the tape. As in the embodiment of FIG. 3, tape 50 is configured with a thick tab 62 to facilitate grasping thereof. Slit 61 in foam layer 52 facilitates stretching of film layer 54 only to effect debonding of adhesive layer 56 from the surface to which it has been adhered.

Representative examples of materials suitable for either a polymeric foam or solid polymeric film layer in the backing of the tape of this invention include polyolefins, such as polyethylene, including high density polyethylene, low density polyethylene, linear low density polyethylene, and linear ultra low density polyethylene, polypropylene, and polybutylenes; vinyl copolymers, such as polyvinyl chlorides, both plasticized and unplasticized, and polyvinyl acetates; olefinic copolymers, such as ethylene/methacrylate copolymers, ethylene/vinyl acetate copolymers, acrylonitrile-butadiene-styrene copolymers, and ethylene/propylene copolymers; acrylic polymers and copolymers; polyurethanes; and combinations of the foregoing. Mixtures or blends of any plastic or plastic and elastomeric materials such as polypropylene/polyethylene, polyurethane/polyolefin, polyurethane/polycarbonate, polyurethane/polyester, can also be used.

Polymeric foam layers for use in the backing of the tapes of the invention generally will have a density of about 2 to about 30 pounds per cubic foot (about 32 to about 481 kg/m³), particularly in tape constructions where the foam is to be stretched to effect debonding.

Preferred for polymeric foam layers in the backing of the tapes of the invention are polyolefin foams. Polymeric foam layers are most preferably polyolefin foams available under the trade designations Volextra™ and Volara™ from Voltek, Division of Sekisui America Corporation, Lawrence, Mass. 01843.

Solid polymeric film backings are preferably selected from polyethylene and polypropylene films, with the most preferred materials being linear low density and ultra low density polyethylene films. A preferred polyethylene film is that available under the trade designation Maxilene™ 200 from Consolidated Thermoplastics Company, Schaumburg, Ill. 60173.

The backing may vary in overall thickness so long as it possesses sufficient integrity to be processable and handleable and provides the desired performance in respect to stretching properties for debonding the backing or tape from a surface. The specific overall thickness selected for a backing will depend upon the physical properties of the polymeric foam layer or layers and any solid polymeric film layer forming the backing. Where only one polymeric film or foam layer of a multi-layer backing is intended to be stretched to effect debonding, that layer should exhibit sufficient physical properties and be of a sufficient thickness to achieve that objective.

A polymeric film layer such as is contained in the construction of FIG. 3 preferably will be about 0.4 to 10 mils in thickness, and will most preferably be about 0.4 to 6 mils in thickness.

The adhesive of the adhesive layer can comprise any pressure-sensitive adhesive, with the particular adhesion properties being dependent on the use of the tape, with the preferred adhesion properties generally ranging from about 4 N/dm to about 200 N/dm, preferably from about 25 N/dm to about 100 N/dm, at a peel angle of 180°, measured according to PSTC-1 and PSTC-3 and ASTM D 903-83 at a peel rate of 12.7 cm/min. Adhesives having higher peel adhesion levels usually require backings having higher tensile strength.

Pressure-sensitive adhesives suitable for application to one side of the backing and/or the other in the tapes of the invention include tackified rubber adhesives, such as natural rubber; olefins; silicones; synthetic rubber adhesives such as polyisoprene, polybutadiene, and styrene-isoprene-styrene, styrene-ethylene-butylene-styrene and styrene-butadiene-styrene block copolymers, and other synthetic elastomers; and tackified or untackified acrylic adhesives such as copolymers of isooctylacrylate and acrylic acid, which can be polymerized by radiation, solution, suspension, or emulsion techniques. Preferred are synthetic rubber adhesives or acrylics.

The thickness of each adhesive layer can range from about 0.6 mils to about 40 mils (about 0.015 to about 1.0 mm), preferably from about 1 mils to about 16 mils (about 0.025 to about 0.41 mm). In this preferred range of thicknesses, the thicker layers tend to cause the tapes to be more easily removable than do thinner layers. This is in contrast to conventional methods of removal, such as removal by peeling at peel angles of 90° or higher. In general, thicker layers of adhesive tend to cause the tapes to exhibit higher peel strength at a peel angle of 180° than do thinner layers. When the tapes of the present invention are released by stretching at a low angle, i.e., under 35°, the adhesive tends to be constrained by the backing and substrate for a single-coated adhesive tape and by the backing and two substrates for a double-coated adhesive tape, and is forced to undergo significant elongation. Under these conditions, the adhesive layer (or each adhesive layer) contracts, which reduces its cross-sectional area. Since the cross-sectional area, i.e., thickness times width, of a thinner layer of adhesive is already less than that of a thicker layer of adhesive, stress, i.e., force per unit area, is greater in the thinner layer of adhesive than in the thicker layer of adhesive. This leads, in effect, to a stiffening of the adhesive. Because stiffer layers offer more resistance to deformation, the force required for debonding is greater. The exposed adhesive layer or layers may be laminated to a conventional release liner prior to use.

Adhesives for adhering one polymeric foam layer to either another polymeric foam layer or a solid polymeric film layer include those pressure-sensitive adhesive compositions described above. Preferably the adhesive layer for adjoining one polymeric layer of the backing to another will be about 1 to 10 mils (about 0.025 to 0.25 mm) in thickness. Other methods of adhering the polymeric layers of the backing to one another include such conventional methods as coextrusion or heat welding.

The tape of this invention can be produced by any conventional method for preparing pressure-sensitive adhesive tapes. For example, the adhesive can either be directly coated onto the backing, or it can be formed as a separate layer and then later laminated to the backing.

Removing the tape from the surface of a substrate can be carried out by simply stretching the tape in a direction up to an angle of about 35° from the surface. Preferably, the tape can be removed from the surface of a substrate by stretching the tape at an angle of no greater than about 10°. Removal at the appropriate angle will result in leaving no substantial or appreciable adhesive residue and in preventing the surface of the substrate from being damaged.

Debonding of a highly elongated adhesive tape of this invention at low angles is characterized by a "sharp" type of crack propagation. Like fracture of glassy materials, a sharp crack leads to high stress concentration at the crack front, where there is a low volume of adhesive material (in which stress may be dissipated). High stress concentration at the crack front leads to what is called brittle cleavage failure of the adhesive. Such failure typically occurs with low force (because of the low amount of energy dissipated in the adhesive material) and is cleanly interfacial.

In contrast, for higher peeling angles, i.e., angles generally greater than 35°, the backing tends not to stretch and the adhesive tends to undergo filamentation and rupture cohesively. Like fracture of glassy materials, propagation of a "blunt" crack is preceded by crazing. In this model, the observed filamentation of the adhesive at higher angles serves principally as an energy dissipation mechanism, analogous to craze fibrils found in glassy materials. The greater the energy dissipation, the greater the resistance to peeling and the higher the force required to peel the tape. A larger volume of material is involved in energy dissipation, and, as stated previously, stress is less concentrated. The adhesive filaments rupture cohesively to leave residue of adhesive on the surface or to cause damage to the surface.

The tape of this invention can be used in several areas, including the following categories:

(1) mounting applications on surfaces such as painted wallboard, plaster, concrete, glass, metal or plastic, such as wall hangings, dispensers, wire clips, body side molding on vehicles, carrying handles, signing application, e.g., road signs, vehicle markings, transportation markings, and reflective sheetings, etc.;

(2) joining or assembly applications;

(3) cushioning or sound deadening applications, such as cushioning materials for placement beneath objects or sound insulative sheet materials;

(4) closure applications, such as container closures, e.g., box closures, closures for food and beverage containers, and the like, diaper closures, surgical drape closure, etc.; and (5) removable labels, such as price tags or identification labels on containers, etc.

The particular construction of the tape, e.g., the type of backing, the type of adhesive compositions, and relative position of backing and adhesive layers, are often required to be different for each category of use. Tape constructions include single-coated tapes and double-coated tapes. A single-coated tape is one that has a layer of pressure-sensitive adhesive on one major surface of the backing. A double-coated tape is one that has a layer of pressure-sensitive adhesive on both major surfaces of the backing.

Preferred hook configurations for use in combination with a tape of this invention for mounting applications are described in U.S. Ser. No. 08/216,135 which was filed on Mar. 22, 1994, is commonly assigned and is incorporated herein by reference. This application corresponds to International application No. PCT/US93/02643 which was filed on Mar. 23, 1993: A particularly preferred hook configuration is that illustrated in FIG. 7 and FIG. 8 of that application. Other preferred picture hanger and wire clip configurations are disclosed in U.S. Ser. No. 29/027,822, U.S. Ser. No. 29/029,273 and U.S. Ser. No. 29/029272, which were filed on Aug. 30, 1994, are commonly assigned and are incorporated herein by reference.

As indicated previously, because of the substantially plastic nature of the backings, the tapes of the present invention do not return to their original shape or size after being stretched, and consequently, can also be employed as tamper-indicating tapes.

Test Methods for Testing Tapes of the Invention

Painted Wallboard Test Panels

U.S. Gypsum ⅜" sheetrock was painted first with Sherwin Williams ProMar™ 200 interior latex primer, then with a single top coat of Sherwin Williams Classic™ 99 interior flat latex wall paint. The painted wallboard was aged under ambient conditions at about 22° C. for a minimum of 48 hours prior to use for testing.

Stretch Release (Debond Force: % Extension at Debond)

A conventional variable angle peel jig (0-20 degrees) was designed to be used with an IMASS Adhesion Tester (available from Imass, Inc., Hingham, Mass. 02018) to measure low angle debond forces for the adhesive backings adhered to a test surface; i.e., painted wallboard. The jig is secured to the IMASS platen designed to securely hold a 2"×12" (5.08 cm×30.5 cm) painted wallboard panel prepared as above for testing on representative mounting application surfaces. Peel speeds on the IMASS Adhesion Tester are variable up to 90 inches per minute (228.6 cm per minute). Test samples ½ inch×3 inches (1.27 cm×7.62 cm) in dimension were adhered to the painted wallboard, to provide a bond area of ½ inch×2 inches (1.27 cm×5.08 cm) with a ½ inch×1 inch (1.27 cm×2.54 cm) non-adhering tab for clamping to the IMASS Tester. A 1 inch×2 inches (2.54 cm×5.08 cm) high impact polystyrene flat piece 3/16 inch (0.476 cm) in thickness was bonded to the side of the test sample opposite the painted wallboard. The test samples were then conditioned 24 hours under conditions of 50% relative humidity and 25° C., and thereafter debonded at a peel speed of 10 inches per minute (25.4 cm per minute) at a peel angle of 2 degrees. The average debond force required to stretch the backing for removal from the substrate was recorded with units of oz./½ inch width. Six independent determinations are made and the results averaged.

The total extension of the backing, relative to the initial bond length, at time of complete debond from the adhered painted wallboard surface is measured with a ruler to determine the % extension at debond. Six independent determinations are made and the results averaged.

Adhesive Residue

The amount of adhesive residue remaining on the painted wallboard was determined by visual inspection.

Surface Damage

The occurrence of any damage to the surface of the painted wallboard was determined by visual inspection.

---

Adhesive Compositions Used for Preparing Tapes of the Invention

A  Composition:  
    Kraton™ 1118    75 pts  
    Finaprene™ 1205    25  
    Piccolyte™ A-135    101  
    Shellflex™ 371    20

Kraton™ 1118 is a styrene-butadiene block copolymer available from Shell Chemical Co.
Piccolyte™ A135 is an alpha pinene resin available from Hercules Chemical Co.
Shellflex™ 371 is a naphthenic oil available from Shell Chemical Co.

B  Composition of Example 2 of U.S. Pat. No. 4,699,842, incorporated herein by reference, as follows:  
    Kraton™ 1657    5.00 pts  
    Regalrez™ 1078    5.00  
    Regalrez™ 1018    1.50  
    Triton™ X-100    0.16  
    Triton™ X-200    0.30  
    Toluene    17.80  
    Irganox™ 1076    0.12  
    Cyanox™ LTPD    0.12  
    Water    5.90  
    Isooctyl acrylate/octylacrylamide/sodium styrene sulfonate terpolymer (87:12:1)    64.10

Kraton™ 1657 is styrene-ethylene-butylene-styrene elastomer from Shell Chemical Company.
Regalrez™ 1078 is a tackifier resin available from Hercules Incorporated.
Regalrez™ 1018 is a tackifier resin available from Hercules Incorporated.
Triton™ X-100 is non-ionic surfactant available from Rohm and Haas Co.
Triton™ X-200 is an anionic surfactant available from Rohm and Haas Co.
Irganox™ 1076 is a phenolic based anti-oxidant available from Ciba-Geigy.
Cyanox™ LTPD is a phenolic based anti-oxidant available from American Cyanamide Co.

C  Composition of Example 1 of U.S. Pat. No. 5,143,972, incorporated herein by reference, prepared by combining Part A and Part B as follows:

-continued

Adhesive Compositions Used for Preparing Tapes of the Invention

| | | |
|---|---|---|
| Part A | Kraton ™ 1657 | 11.150 pts |
| | Regalrez ™ 1018 | 8.360 |
| | REZ-D ™ 2084 | 13.940 |
| | Irganox ™ 1076 | 0.112 |
| | Cyanox ™ LTDP | 0.112 |
| | Tinuvin ™ 328 | 0.033 |
| | Uvinol ™ 400 | 0.033 |
| | Toulene | 41.260 |
| Part B | Reaction product of: | |
| | Isooctylacrylate | 8.800 pts |
| | Acrylamide | 0.250 |
| | Acrylic Acid | 0.250 |
| | 2-Polystyrylethyl methacrylate | 1.350 |
| | Ethyl Acetate | 7.650 |
| | Methyl Ketone | 1.700 |
| | Toulene | 5.000 |

REZ-D ™ is a tackifier resin available from Hercules Incorporated.
Tinuvin ™ 328 is an ultraviolet inhibitor available from Ciba-Geigy Corp.

| | | |
|---|---|---|
| D Composition: | Finaprene ™ 1205 | 7.095 |
| | Finaprene ™ 411 | 13.176 |
| | Piccolyte ™ A-135 | 20.270 |
| | Shellflex ™ 371 | 2.027 |
| | Ethanox ™ 330 | 0.405 |
| | Toluene | 57.027 |

Finaprene ™ 1205 is a styrene-butadiene tapered diblock copolymer available from Fina Oil and Chemical Co.
Finaprene ™ 411 is a radial styrene-butadiene-styrene block copolymer available from Fina Oil and Chemical Co.
Ethanox ™ 330 is a phenolic based antioxidant available from Ethyl Corp.

| | | |
|---|---|---|
| E Composition: | Kraton ™ 1107 | 100 pts |
| | Wingtack ™ Extra | 100 |
| | Irganox ™ 1076 | 1.5 |
| | Cyanox ™ LTPD | 1.5 |

Kraton ™ 1107 is a styrene-isoprene-styrene block copolymer available from Shell Chemical Co.
Wingtack ™ Extra is a hydrocarbon resin tackifier available from The Goodyear Tire and Rubber Co.

| | |
|---|---|
| F Composition: | 2-mil and 5-mil adhesive transfer tapes available under the trade designations Scotch ™ VHB F-9460PC and F-9469PC, respectively, from 3M Company |
| G Composition: | 2-mil and 5-mil adhesive transfer tapes available under the trade designations Scotch ™ F-9752PC and F-9755PC, respectively, from 3M Company |

Examples 1-7

Tape constructions of the invention of the type illustrated in FIG. 3 above were prepared as follows:

The adhesive compositions A through E indicated in Table 1 in respect to each Example were coated onto silicone release liners and dried at 80° C. for 15 minutes in a forced air drying oven to prepare adhesive films of the thicknesses indicated in Table 1 (with the reference numeral in relationship to the adhesive layer referring to the respective adhesive layer shown in FIG. 3). Adhesive thickness was measured using an Ono Sokki Model EG-225 thickness gauge available from Ono Sokki Co., Ltd. The exposed surfaces of each adhesive film were then laminated to either Volextra™ EV-1029 foam as polymeric foam layer 32 in FIG. 3 (a coextruded 6 pcf, 31 mil polyethylene vinyl acetate copolymer foam with a 3 mil thick ethylene vinyl acetate film layer extruded on one side of the foam; available from Voltek Division of Sekisui America Corporation, Lawrence, Mass.) in the case of adhesive layer 39 or to each major surface of a 2 mil Maxilene™ 200 LLDPE film as polymeric film layer 34 in FIG. 3 (available from Consolidated Thermoplastics Company, Schaumburg, Ill.) in the case of adhesive layers 36 and 38. Subsequent to lamination of the adhesive layers, the surfaces of the Volextra™ EV 1029 foam and LLDPE film were corona treated. Each lamination step included a 4-pass roll-down using a standard 4.5 lb (2.04 kg) hand-operated rubber covered roller. After the above laminates were prepared, the exposed surface of adhesive layer 36 was contacted with the exposed surface of film layer 33 of polymeric foam/film layer 31 and laminated thereto following the above procedure to provide a tape construction shown in FIG. 3. In the construction of this tape, the laminate consisting of the LLDPE film 34 and adhesive layers 36 and 38 actually extended 1 inch (2.54 cm) beyond the laminate of polymeric foam/film layer 31 and adhesive 39. This extended length served as a tab to stretch the LLDPE film layer from the coextruded foam/film-adhesive interface 31/36 and wall surface 18. In actual testing, this extended tab was 1 inch (2.54 cm) in length for clamping to the IMASS Adhesion tester apparatus arm.

The tapes of these Examples 1-7 were tested according to the Test Methods above with the resulting data being that indicated in Table 1 below.

TABLE 1

| Example | Adhesive | Adhesive Layer (reference numeral in FIG. 3) in mils | | | Debond Force oz./1/2 in. | % Extension @ Debond | Adhesive Residue | Surface Damage |
|---|---|---|---|---|---|---|---|---|
| | | 39 | 36 | 38 | | | | |
| 1 | A | 2.9 | 2.9 | 4.8 | 52.8 | 758 | Very Slight | None |
| 2 | B | 2.9 | 2.9 | 4.9 | 47.4 | 694 | Very Slight | None |
| 3 | C | 2.8 | 2.8 | 4.7 | 56.0 | 705 | None | None |
| 4 | D | 2.8 | 2.8 | 5.1 | 47.2 | 611 | None | None |
| 5 | E | 3.1 | 3.1 | 4.9 | 58.6 | 734 | None | None |
| 6 | F | 2.0 | 2.0 | 5.0 | 58.7 | 722 | Very Slight | None |
| 7 | G | 2.0 | 2.0 | 5.0 | 52.0 | 751 | Slight | None |

Examples 8-14

Tape constructions of the invention of the type illustrated in FIG. 4 above were prepared as follows:

Adhesive films of the adhesive composition indicated in Table 2 in respect to each Example were prepared as described in Examples 1-7 above and tapes were prepared utilizing Volextra™ EV-1029 foam (described above and available from Voltek) as polymeric foam layer 41 (FIG. 4) and Volara™ 15 EO foam (a 15 mil thick, 15 pcf polyethylene vinyl acetate copolymer foam from Voltek, Division of Sekisui America Corporation) as polymeric foam layer 44. Again the reference numeral in respect of each adhesive layer is reference to the respective adhesive layers in FIG. 4.

The tapes of these Examples 8-14 were tested according to the Test Methods above with the resulting data being that indicated in Table 2 below.

TABLE 2

| Example | Adhesive | Adhesive Layer (reference numeral in FIG. 4) in mils | | | Debond Force oz./1/2 in. | % Extension @ Debond | Adhesive Residue | Surface Damage |
|---|---|---|---|---|---|---|---|---|
| | | 49 | 46 | 48 | | | | |
| 8 | A | 3.1 | 3.1 | 4.8 | 72.8 | 573 | Slight | None |
| 9 | B | 2.9 | 2.9 | 4.9 | 67.4 | 538 | Very Slight | None |
| 10 | C | 2.8 | 2.8 | 4.7 | 63.5 | 500 | None | None |
| 11 | D | 2.8 | 2.8 | 5.0 | 63.7 | 457 | None | None |
| 12 | E | 3.1 | 3.1 | 4.9 | 65.5 | 517 | None | None |
| 13 | F | 2.0 | 2.0 | 5.0 | 64.7 | 538 | Very Slight | None |
| 14 | G | 2.0 | 2.0 | 5.0 | 66.7 | 563 | Slight | None |

Examples 15-16

Tape constructions of the invention of the type illustrated in FIG. 2 above were prepared as follows:

Adhesive films of the adhesive compositions indicated in Table 3 in respect to each Example were prepared as described in Examples 1-7 above and tapes were prepared utilizing Volara™ 6E polyethylene vinyl acetate copolymer foam (6 density pcf, thickness 62.5 mil foam from Voltek, Division of Sekisui America Corporation) as polymeric foam layer 22 and a Maxilene™ 200, 2 mil LLDPE film (available from Consolidated Thermoplastics Company) as polymeric film layer 24. Reference numerals in respect of the adhesive layers are reference to the respective adhesive layers in FIG. 2.

The tapes of these Examples 15-16 were tested according to the Test Methods above with the resulting data being that indicated in Table 3 below.

Examples 17-19

Tape constructions of the invention of the type illustrated in FIG. 1 above were prepared following generally the procedures of Examples 1-7 above using a Volara™ 12E foam (a polyethylene vinyl acetate copolymer foam, density 12 pcf, thickness 31.3 mil, from Voltek, Division of Sekisui America Corporation) as polymeric foam layer 11. Again the reference numeral in respect of each adhesive layer is reference to the respective adhesive layers in FIG. 1.

The tapes of these Examples 17-19 were tested according to the Test Methods above with the resulting data being that indicated in Table 4 below.

Example 20

A tape construction of the invention of the type illustrated in FIG. 5 above was prepared following generally the procedures of Examples 1-7 above using as foam/film layer 51 a Volextra™ foam composite comprising a 4 pcf, 62 mil, polyethylene vinyl acetate copolymer foam heat laminated to a 2 mil ethylene vinyl acetate copolymer film (available from Voltek). Layer 54 was a Maxilene™ 200 linear low density

TABLE 3

| Example | Adhesive | Adhesive Layer (reference numeral in FIG. 2) in mils | | | Debond Force oz./1/2 in. | % Extension @ Debond | Adhesive Residue | Surface Damage |
|---|---|---|---|---|---|---|---|---|
| | | 29 | 26 | 28 | | | | |
| 15 | C | 2.8 | 2.8 | 4.7 | 96.9 | 593 | None | None |
| 16 | E | 3.1 | 3.1 | 4.9 | 93.5 | 571 | None | None | polyethylene film, 2.5 mil, available from Consolidated Thermoplastics, Inc. Adhesive Composition D was employed.

TABLE 4

| Example | Adhesive | Adhesive Layer (reference numeral in FIG. 1) in mils 14 | Adhesive Layer (reference numeral in FIG. 1) in mils 12 | Debond Force oz./1/2 in. | % Extension @ Debond | Adhesive Residue | Surface Damage |
|---|---|---|---|---|---|---|---|
| 17 | B | 2.9 | 4.9 | 69.6 | 478 | Very Slight | None |
| 18 | E | 3.1 | 4.9 | 69.1 | 481 | None | None |
| 19 | F | 2.0 | 5.0 | 71.7 | 496 | Very Slight | None |

What is claimed is:

1. A pressure-sensitive adhesive tape comprising a foam backing and a first layer of pressure-sensitive adhesive composition coated on at least one surface of said backing, said foam backing having a density of about 2 to about 30 pounds per cubic foot, a thickness of about 15 to about 125 mils, a Young's modulus of less than about 2,400 psi, and a lengthwise elongation at break of from about 50% to about 1200%, said tape configured to be firmly bonded to a substrate and thereafter being removable therefrom after being stretched at an angle no greater than about 35° from the surface of said substrate without said backing rupturing prior to the removal of said tape from said substrate and without leaving substantial pressure-sensitive adhesive residue on said substrate.

2. A pressure-sensitive adhesive tape comprising a multi-layer backing and a first layer of pressure-sensitive adhesive composition coated on at least one surface of said backing, said backing comprising a layer of polymeric foam and at least one of an additional polymeric foam layer or a film layer, each said layer of polymeric foam having a thickness of about 5 to about 1000 mils, said backing having a Young's modulus of less than about 2,400 psi and a lengthwise elongation at break of from about 50% to about 1200%, said tape configured to be firmly bonded to a substrate and thereafter being removable therefrom after being stretched at an angle no greater than about 35° from the surface of said substrate without said backing rupturing prior to the removal of said tape from said substrate and without leaving substantial pressure-sensitive adhesive residue on said substrate.

3. A pressure-sensitive adhesive tape as defined in claim 2, wherein said backing has a Young's modulus of less than about 2,000 psi.

4. A pressure-sensitive tape as defined in claim 2, wherein said backing has a Young's modulus between about 1,000 psi and 1,400 psi.

5. A pressure-sensitive adhesive tape comprising a backing and a first layer of a pressure-sensitive composition coated on at least one surface of said backing, said backing having a thickness of at least about 30 mils, said backing further having a lengthwise elongation at break of from about 50% to about 1200%, said backing including a non-adhesive region forming a pull tab along an end of said adhesive tape that can be grasped by a user to stretch remove the adhesive tape from an associated substrate, said tape configured to be firmly bonded to a substrate and thereafter being removable therefrom after being stretched at an angle no greater than about 35° from the surface of said substrate without said backing rupturing prior to the removal of said tape from said substrate and without leaving substantial pressure-sensitive adhesive residue on said substrate.

6. An adhesive tape as defined in claim 1, further including a non-adhesive region forming a pull tab along an end of said adhesive tape that can be grasped by a user to stretch remove the adhesive tape from an associated substrate.

7. An adhesive tape as defined in claim 2, further including a non-adhesive region forming a pull tab along an end of said adhesive tape that can be grasped by a user to stretch remove the adhesive tape from an associated substrate.

* * * * *